United States Patent Office 2,702,862
Patented Feb. 22, 1955

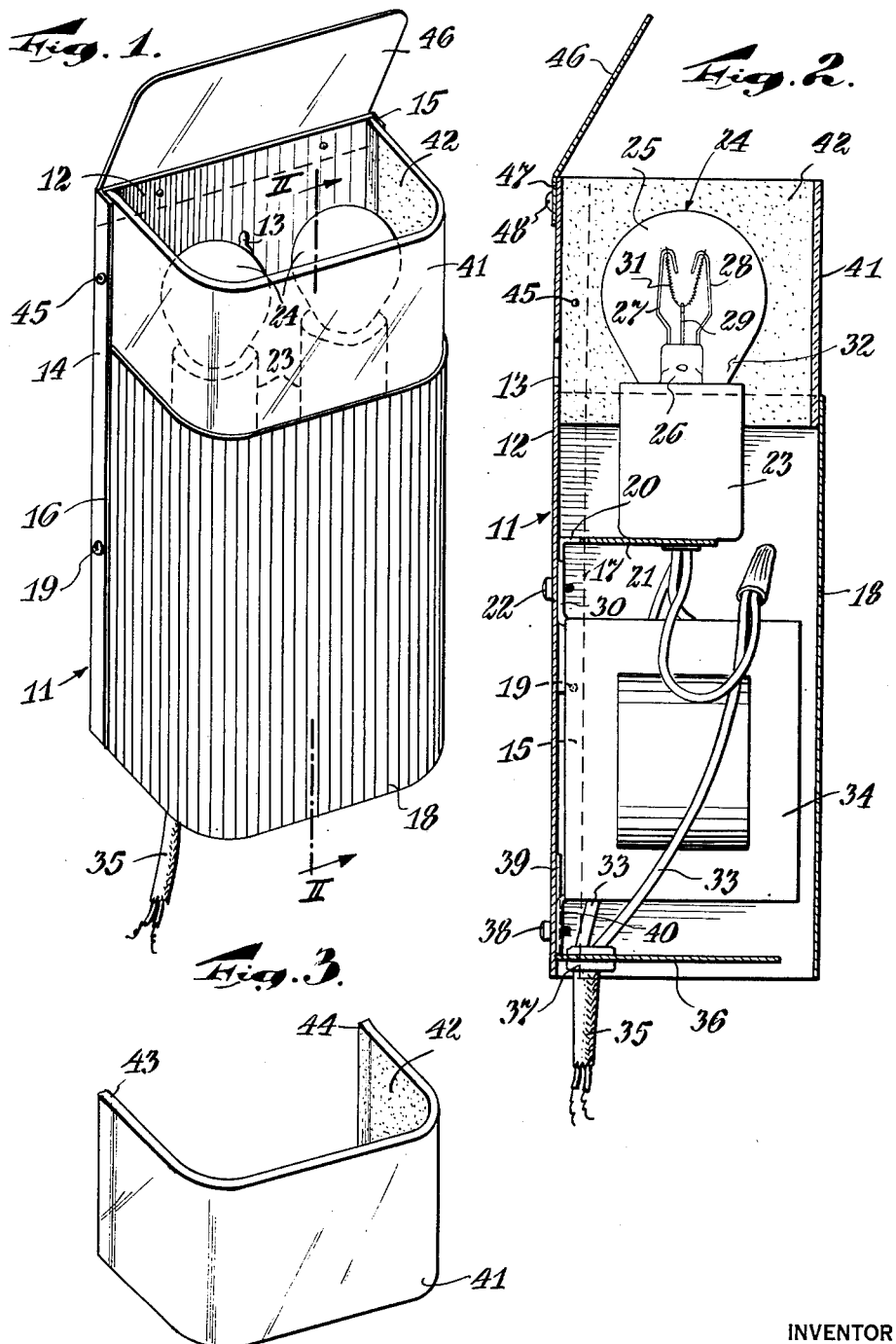

2,702,862

HOUSED LAMP AND FIXTURE

Horace R. Finney, Belmont, Mass., assignor to Westinghouse Electric Corporation, East Pittsburgh, Pa., a corporation of Pennsylvania Application May 7, 1952, Serial No. 286,584

7 Claims. (Cl. 250—43)

This invention relates to lamp fixtures and, more particularly, to one for housing an ultra-violet radiation generating lamp for the multiple purpose of air sterilization, deodorization, and the development of visible light.

The principal object of my invention, generally considered, is to provide a fixture housing an ultra-violet light generator, said fixture being open at top and bottom or at other locations, to allow for circulation of air to be sterilized and deodorized, and that portion of the fixture immediately adjacent the lamp being translucent and covered with a phosphor on its inner surface for the generation of visible light from an impingement of ultra-violet radiations thereon.

Another object of my invention is to provide a housing, for negative-glow ultra-violet discharge lamp means, having a translucent window opposite the lamp or lamps coated interiorly with a phosphor to develop visible radiations so that it may also serve as a night light.

A further object of my invention is to provide a housing for an ultra-violet radiation generating lamp, which may also enclose a ballast and is open at top and bottom to create a draft over the lamp.

A still further object of my invention is to provide a flat or curved source of visible light with a low to medium intensity, created by impinging the back of a flat phosphorized surface with ultra-violet radiations.

Other objects and advantages will become apparent as the description proceeds.

In the drawing, in which like parts are designated by like reference characters:

Figure 1 is a view in perspective of a typical wall-mounted fixture with lamps housed therein and embodying my invention.

Figure 2 is a vertical sectional view on the line II—II of Figure 1, in the direction of the arrows.

Figure 3 is a perspective view of the phosphorized translucent lamp shield detached from the remainder of the fixture.

In general, one embodiment of my fixture consists of a simple channel with two lips bent to an acute angle to accommodate a ballast shield and a fluorescent or phosphorized plastic or glass cover shield for one or more ultra-violet radiation generators. A preferred type of generator is that illustrated and sold by the Westinghouse Electric Corp. under the trade-mark "Odorout." The construction of such a lamp is generally as disclosed and claimed in the Morehead Patent No. 2,392,333, dated Jan. 8, 1946.

The purpose of the phosphorized plastic or glass is to produce visible light from the 2537 A. U. output from the lamp which, for that purpose, is desirably provided wth a clear bulb of ultra-violet-transmitting glass. Such glass is desirably permeable to not only the ultra-violet of 2537 A. U. wave length for the generation of light from the phosphor, but also to sorter wave lengths, such as those of 1849 A. U. for the generation of ozone. The fixtures are open at top and bottom to allow the heat from the lamp or lamps and any housed auxiliary equipment when operating to cause circulation of air through it, hence circulating the ozone generated and distributing it throughout a containing room, and bringing in contaminated air for purification and deodorization.

Referring to the drawing in detail, the housing 11 of the present embodiment of my invention consists of a back plate 12 apertured as indicated at 13 for the reception of connecting means for holding it on a wall. Outstanding from the front of the plate are the flanges or lips 14 and 15 which desirably converge slightly as they extend from the plate to hold therebetween the slightly diverging edge portions 16 and 17 of an opaque cover member housing 18. These edge portions seat flat against the inner surfaces of the flanges 14 and 15. This cover member is desirably formed of light metal, such as aluminum or other rigid material, and decorated on its outer surface, as by the vertical grooves indicated, or in some other suitable manner. It is desirably held in place by screws or other fastening means 19 passing through the flanges 14 and 15 and the corresponding edge portions of the cover.

Inside the cover 18 is disposed a bracket 21 held to the back plate 12 by any desired means, such as some of the screws 22 passing through said plate and spaced depending legs 20 of the bracket. On said bracket 21 are supported one or more sockets 23 for the ultra-violet generating lamp or lamps 24. Each lamp in the present embodiment comprises a bulb 25 suitably based and enclosing amount 26 from which upstand supports 27, 28, and 29. A filament 31, desirably V or U-shaped as illustrated in Figure 2, is held in place by said supports. When energized, some of the operating current passes through the filament and some discharges across the space between opposite end portions thereof, which end portions are desirably covered with electron-emission material, so as to create a glow discharge through an atmosphere containing mercury vapor, supplied as from a drop thereof 32. Thus the resonance radiations of mercury at 2537 A. U. are generated, along with other ultra-violet radiations.

Power is supplied to the lamp or lamps through suitable conductors 33 to a suitable ballast, such as the device 34, supported from the back plate 12 in any desired manner, as by some of the screws 22 passing through the back plate and flange 30 of its housing, and some of the screws 38 passing through said plate and flange 40 of its housing. The flexible cord 35 supplying such power is desirably supported from the housing by a bracket 36, as by passing through an insulator 37 held therein, said bracket being secured to the back plate 12 by some of the screws 38 passing therethrough and through spaced upstanding bracket legs 39. Both of the brackets 21 and 36 are small enough to allow considerable clearance between them and the housing 18 for the passage of circulating air.

The metal cover member 18 terminates short of the top of the back 12, and the lamp or lamps 24 upstanding thereabove are enclosed in a translucent cover member 41, desirably formed of transparent or translucent plastic material or glass coated on its interior surface with fluorescent material or phosphor 42, whereby ultra-violet radiations are changed to visible light prior to loss by passing through the translucent material. Its lower edge portion telescopes in or is overlapped by the upper edge portion of the metal housing member 18. The side edge portions 43 and 44 of the translucent portion 41, are desirably formed like the metal portion 18, that is, flared outwardly slightly to set between the converging flanges 14 and 15. They are connected thereto by suitable means such as screws 45.

In order to better distribute the air passing up through the housing 18 and out of the top of the phosphorized member 41, I provide a deflector plate 46, desirably formed of light metal such as aluminum, and having a lower edge portion 47 bent at an angle to the main portion of the plate, as indicated in Figures 1 and 2, and secured to the top edge portion of the back plate, as by means of screws 48. By virtue of this deflector, the air instead of tending to pass upward along the wall to which the housing is connected, is caused to pass out into the room to a greater extent. In the same way, the deflector reflects radiations from the lamp and light generated by the phosphor 42 out into the room, instead of allowing it to go directly to the ceiling.

From the foregoing, it will be seen that I have devised means for not only sterilizing and deodorizing the air in a room, but also for generating light of low intensity on a flat and/or curved surface. That is, the shield 41 has plain flat surfaces on its front and sides, the front plain flat surface being relatively large in area, which are illuminated during operation to low intensity. They are connected by cylindrically curved surfaces of a selected degree of curvature. The appearance of the housing is improved and packing thereof facilitated by the slight converging of the flanges 14 and 15 and the corresponding angularity of the edge portions of the metal and transparent cover portions. Thus, the extreme outer surfaces of the flanges 14 and 15 lie in planes normal to the plate 12 and tangent to the outer surface of the cover portion 18 at the cylindrically curved portions thereof.

Although a preferred embodiment of my invention has been disclosed, it will be understood that modifications may occur to those skilled in the art.

I claim:

1. In combination, a negative-glow lamp having an envelope permeable to long and short wave ultra-violet radiations, a housing enclosing said lamp, but open top and bottom to facilitate thermally induced air circulation, and a cover disposed above said housing and carrying a coating of material which fluoresces when long-wave ultra-violet radiations impinge thereon.

2. In combination, a negative-glow lamp having an envelope permeable to long and short wave ultra-violet radiations, a ballast therefor, and a housing enclosing said lamp and ballast, but open top and bottom to facilitate thermally induced air circulation, said housing having another opening adjacent said lamp, and a cover of translucent material normally closing said opening, said cover carrying a coating of material which fluoresces when long-wave ultra-violet radiations impinge thereon.

3. In combination, a housing comprising a back plate consisting of a web and flanges outstanding therefrom, said web serving for the securing of said plate to a wall, an opaque cover member comprising a plate with flat front and flat side portions connected by cylindrical portions, means connecting said flanges and edge portions, a bracket outstanding from the back plate, socket means supported on said bracket, ultra-violet radiations generating means mounted in said socket means, a ballast, means mounting said ballast on said back plate, power-supply conductors, and a transparent cover member telescoping with the upper edge portion of said opaque cover member and coated interiorly with means fluorescing with the generation of visible light when ultra-violet radiations impinge thereon.

4. In combination, a housing comprising a back plate consisting of a web and flanges outstanding therefrom, said web serving for the securing of said plate to a wall, an opaque cover member comprising a plate with flat front and flat side portions connected by cylindrical portions, means connecting said flanges and edge portions, a bracket outstanding from the back plate, socket means supported on said bracket, ultra-violet generating means mounted in said socket means, a ballast, means mounting said ballast on said back plate, power-supply conductors, a transparent cover member telescoping with the upper edge portion of said opaque cover member and coated interiorly with means fluorescing with the generation of visible light when ultra-violet radiations impinge thereon, and a plate secured to the top edge portion of the back plate, extending diagonally upward and outward therefrom to partially overlie the ultra-violet generating means, for deflecting the thermally-induced air currents and reflecting radiations from the generator and fluorescing means.

5. In combination, a housing comprising a back plate consisting of a web and flanges outstanding therefrom, said web serving for the securing of said plate to a wall, said flanges converging toward one another slightly, an opaque cover member comprising a plate with a flat front and flat side portions connected by cylindrical portions, the back edge portions of said side faces being flared outwardly to seat flat against the inner surfaces of the outstanding flanges of the back plate, means connecting said flanges and edge portions, a bracket outstanding from the back plate, socket means supported on said bracket, ultra-violet generating means mounted in said socket means, a second bracket disposed beneath said first mentioned bracket, a ballast, means mounting said ballast on said back plate between said brackets, power-supply conductors passing through and supported by said second bracket, a transparent cover member telescoping with the upper edge portion of said opaque cover member and coated interiorly with means fluorescing with the generation of visible light when ultra-violet radiations impinge thereon, and a plate secured to the top edge portion of the back plate, extending diagonally upward and outward therefrom to partially overlie the ultra-violet generating means, for deflecting the thermally-induced air currents and reflecting radiations from the generator and fluorescing means.

6. In combination, a negative-glow lamp having an envelope permeable to long and short wave ultra-violet radiations, a housing enclosing said lamp, but open top and bottom to facilitate thermally-induced air circulation, a cover carrying a coating of material which fluoresces when long-wave ultra-violet radiations impinge thereon, and a plate secured to the top portion of said housing and extending diagonally upward and outward therefrom to an elevation above said cover to partially overlie the ultra-violet generating means, for deflecting the thermally induced air currents and reflecting radiations from the generator and cover.

7. In combination, a housing comprising a back plate consisting of a web and flanges outstanding therefrom, said web serving for the securing of said plate to a wall, an opaque cover member comprising a plate with flat front and flat side portions connected by cylindrical portions, means connecting said flanges and edge portions, a bracket outstanding from the back plate, socket means supported on said bracket, ultra-violet generating means mounted in said socket means, a ballast, means mounting said ballast on said back plate, power-supply conductors, a transparent cover member telescoping with the upper edge portion of said opaque cover member, and a plate secured to the top edge portion of the back plate, extending diagonally upward and outward therefrom to partially overlie the ultra-violet generating means, for deflecting the thermally-induced air currents and reflecting radiations from the generator.

References Cited in the file of this patent

UNITED STATES PATENTS

| Number | Name | Date |
|---|---|---|
| 2,317,265 | Foerste et al. | Apr. 20, 1943 |
| 2,346,522 | Gessel | Apr. 11, 1944 |
| 2,350,462 | Johns | June 6, 1944 |
| 2,359,021 | Campbell et al. | Sept. 26, 1944 |
| 2,447,498 | Ellner | Aug. 24, 1948 |
| 2,467,661 | De Ment | Apr. 19, 1949 |
| 2,485,410 | Pope | Oct. 18, 1949 |
| 2,549,860 | Swanson | Apr. 24, 1951 |
| 2,589,613 | Hicks | Mar. 18, 1952 |
| 2,594,903 | Freedman et al. | Apr. 29, 1952 |